United States Patent [19]

Ostlinning et al.

[11] Patent Number: 4,595,748

[45] Date of Patent: Jun. 17, 1986

[54] PROCESS FOR THE PREPARATION OF HIGH MOLECULAR WEIGHT, OPTIONALLY BRANCHED POLYARYLENE SULPHIDES

[75] Inventors: Edgar Ostlinning, Duesseldorf; Karsten Idel, Krefeld, both of Fed. Rep. of Germany

[73] Assignee: Bayer Aktiengesellschaft, Leverkusen, Fed. Rep. of Germany

[21] Appl. No.: 661,201

[22] Filed: Oct. 15, 1984

[30] Foreign Application Priority Data

Oct. 22, 1983 [DE] Fed. Rep. of Germany ....... 3338501

[51] Int. Cl.$^4$ ............................................. C08G 75/14
[52] U.S. Cl. ................................ 528/388; 264/331.11
[58] Field of Search ......................................... 528/388

[56] References Cited

U.S. PATENT DOCUMENTS

| | | | |
|---|---|---|---|
| 4,303,781 | 12/1981 | Idel et al. | 528/388 |
| 4,331,801 | 5/1982 | Idel et al. | 528/388 |
| 4,362,864 | 12/1982 | Idel et al. | 528/388 |
| 4,424,339 | 1/1984 | Idel et al. | 528/388 |
| 4,433,138 | 2/1984 | Idel et al. | 528/388 |
| 4,451,644 | 5/1984 | Ostlinning et al. | 528/388 |
| 4,464,507 | 8/1984 | Ostlinning et al. | 528/388 |
| 4,500,702 | 2/1985 | Ostlinning et al. | 528/388 |
| 4,501,884 | 2/1985 | Ostlinning et al. | 528/388 |

FOREIGN PATENT DOCUMENTS 0073526 3/1983 European Pat. Off.
0109637 5/1984 European Pat. Off.

Primary Examiner—Melvyn I. Marquis
Attorney, Agent, or Firm—Connolly and Hutz

[57] ABSTRACT

This invention relates to a process for the preparation of high molecular weight, optionally branched polyarylene sulphides. These may be prepared in polar organic solvents in the absence of water, substances containing water being dehydrated in the reaction mixture before the reaction.

7 Claims, No Drawings

PROCESS FOR THE PREPARATION OF HIGH MOLECULAR WEIGHT, OPTIONALLY BRANCHED POLYARYLENE SULPHIDES

This invention relates to a process for the preparation of high molecular weight, optionally branched polyarylene sulphides. These may be prepared in polar organic solvents in the absence of water, any components containing water being dehydrated in the reaction mixture before the reaction.

Polyarylene sulphides and methods of their preparation are known (see, for example, U.S. Pat. Nos. 2 513 188, 3 117 620, 3 354 835, 3 790 536, 3 839 301, 4 038 259, 4 038 260, 4 038 261, 4 038 262, 4 056 515, 4 060 520, 4 064 114, 4 282 347, DE-AS Nos. 2 453 485, 2 553 749, 2 623 333, 2 623 363, DE-OS Nos. 2 930 797, 2 930 710, 3 019 732, 3 030 488).

All these processes use starting materials which must be at least partly dehydrated in a separate step before the reaction of the halogenated aromatic compounds.

Thus, for example, the process according to DE-OS No. 3 030 488 uses alkali metal sulphides which must be partly dehydrated in a separate step before the reaction to form polyarylene sulphides. The hydrated alkali metal sulphides are reduced to a water content of 1 to 2.4 mol of water per mol of alkali metal sulphide. According to U.S. Pat. Nos. 4 056 515 and 4 064 520, water contents of 1 mol or more per mol of sulphur donor remain in the reaction mixtures after the preliminary dehydration. In U.S. Pat. No. 4 238 347, water is added to the reaction mixture after the dehydration in order to adjust the reaction mixture to a certain water content.

In all these processes, it is regarded as particularly advantageous that not all the reactants are present during the dehydration. The halogenated aromatic compounds, in particular, are added with part of the solvent only after they themselves have undergone a preliminary dehydration.

It has now been found, however, that it is particularly advantageous to have all the reaction components together in an anhydrous state from the beginning of the reaction and then heat them to at least 150° C. Any starting materials containing water, used in the form of solutions or solvent-free melts or in solid form, are then added at such a rate that the water introduced with them can be distilled off continuously, for example by azeotropic distillation. It is thereby possible to obtain an anhydrous reaction mixture, which is then heated to the reaction temperature.

The present invention thus provides a process for the preparation of optionally branched polyarylene sulphides from (a) 50–100 mol-% of dihalogenated aromatic compounds corresponding to the formula

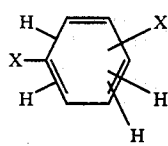
(I)

and 0–50 mol-% of dihalogenated aromatic compounds corresponding to the formula

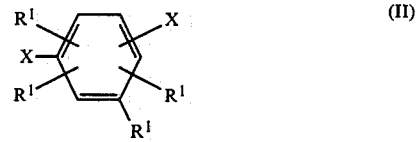

wherein
X represents halogens such as chlorine or bromine in the meta- or para-position to each other, and
$R^1$, which may all be identical or different, represent hydrogen, alkyl, cycloalkyl, aryl, alkylaryl, or arylalkyl, and the two groups represented by $R^1$ in the ortho-position to each other may be linked together to form an aromatic or heterocyclic ring and at least one $R^1$ is other than hydrogen, and (b) 0 to 5 mol-%, preferably 0.1 to 2.5 mol-%, based on the sum of dihalogenated aromatic compounds corresponding to Formulae (I) and (II), of a tri- or tetrahalogenated aromatic compound corresponding to the formula $$ArX_n \qquad (III)$$

wherein
Ar represents an aromatic or heterocyclic group,
X represents halogen such as chlorine or bromine and
n represents the integer 3 or 4, and (c) alkali metal sulphides, preferably sodium or potassium sulphide or mixtures thereof, preferably in the form of their hydrates or aqueous mixtures, optionally together with alkali metal hydroxides such as sodium and potassium/hydroxide, the molar ratio of (a+b):c lying within the range of from 0.85:1 to 1.15:1, preferably from 0.95:1 to 1.05:1, in (d) an organic solvent, optionally in the presence of catalysts and/or other cosolvents, characterised in that the molar ratio of alkali metal sulphides (c) to the organic solvent (d) lies within the range of from 1:2 to 1:15 and all the anhydrous starting materials are brought together and heated to at least 150° C., preferably 165° to 205° C., and components containin water, used in the form of a solution of solvent-free melt, or solids are introduced at such a rate that the water introduced with them is removed from the reaction mixture by distillation, and the reaction is subsequently carried out at temperatures of from 210° to 270° C., preferably from 215° to 250° C., optionally under a slight excess pressure.

Catalysts known for this purpose, such as alkali metal fluorides, alkali metal phosphates or alkali metal carboxylates, may be used in the usual quantities, amounting to 0.02 to 1.0 mol of catalyst per mol of alkali metal sulphide.

Cosolvents such as, for example, N,N-dialkylcarboxylic acids amides of $C_1$–$C_8$-aliphatic or $C_6$–$C_{12}$-aromatic carboxylic acids may be used in quantities of from 0.02 to 1.0 mol, based on 1 mol of alkali metal sulphide.

$R^1$ in formula II preferably stands for hydrogen, $C_1$–$C_{20}$-alkyl, $C_5$–$C_{20}$-cycloalkyl, $C_6$–$C_{24}$-aryl, $C_7$–$C_{24}$-alkylaryl or $C_7$–$C_{24}$-aralkyl. Moreover, two groups represented by $R^1$ in the ortho-position to each other may together form a condensed aromatic ring having a total of 6 carbon atoms or a condensed heterocyclic aromatic ring having 5 to 6 ring atoms with 1 to 3 heteroatoms such as N, O or S.

Ar preferably stands for an aromatic group having 6 to 24 carbon atoms or a heterocyclic aromatic group having 6 to 24 ring atoms, most preferably an aromatic group having 6 to 10 carbon atoms or a heterocyclic group having 6 to 10 ring atoms, which heterocylcic groups may contain up to 3 hetero atoms such as N, S or O.

The alkali metal sulphides are used in the usual quantities and in the usual manner. Suitable sulphides are, for example, lithium, sodium, potassium and rubidium sulphides, sodium and potassium sulphide being preferred. The alkali metal sulphides may be prepared in situ from hydrogen sulphides by reaction with alkali metal hydroxides such as LiOH, NaOH or KOH. Both the sulphides and the hydroxides may be used as mixtures.

According to the invention, meta- and para-dihalogenated aromatic compounds of the formulae (I) or (II) may be used. In such cases, the ratio of meta- to para-dihalogenated aromatic compounds may be up to 30:70.

It is particularly preferred to use para-dihalogenated aromatic compounds. If branched polyarylene sulphides are to be produced, it is necessary to use at least 0.05 mol-% of a tri- or tetra-halogenated aromatic compound of formula (III), the quantity of tri- or tetra-halogenated aromatic compound used, based on the sum of dihalogenated aromatic compounds, being preferably from 0.05 to 0.5 mol-%.

A polyhalogenated aromatic compound of formula (III) may be used in a quantity of up to 5 mol-%.

The following are examples of dihalogenated aromatic compounds of formula (I) to be used according to the invention: p-Dichlorobenzene, p-dibromobenzene, 1-chloro-4-bromobenzene, 1,3-dichlorobenzene, 1,3-dibromobenzene, 1-chloro-3-bromobenzene and 1-chloro-4-bromobenzene. They may be used alone or as mixtures with each other. 1,4-Dichlorobenzene and 1,4-dibromobenzene are particularly preferred.

The following are examples of dihalogenated aromatic compounds of formual (II) to be used according to the invention: 2,5-Dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene, 2,4-dichlorotoluene, 2,4-dichloroxylene, 2,4-dibromocumene and 1-cyclohexyl-3,5-dichlorobenzene. All these may be used alone or in admixture with each other.

The following are examples of tri- and tetrahalogenated aromatic compounds of formula (III) to be used according to the invention: 1,2,3-Trichlorobenzene, 1,2,4-trichlorobenzene, 1,2,4-tribromobenzene, 1,3,5-trichloro-2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalane, 1,2,4,5-tetrachlorobenzene, 2,2',4,4'-tetrachlorobiphenyl, 1,3,5-trichlorotriazine and 1,3,5-tribromotriazine.

The organic solvents used according to the invention may be, for example, N-alkyllactams, such as N-methylpyrrolidone, N-ethylpyrrolidone, N-methylpiperidone, N-isopropylpyrrolidone or N-methylcaprolactam or other polar organic solvents in which the reactants are at least partly soluble and which have a boiling point above 200° C. at the pressure at which the reaction is carried out.

The reaction time may be up to 24 hours and is preferably 2 to 18 hours.

The reaction is generally carried out at atmospheric pressure although employment of an excess pressure of from 0.1 to 8 bar may be advantageous in special cases.

In the process according to the invention, the anhydrous components of the reaction may be brought together in any sequence. When this mixture has been heated to 150°–205° C., preferably 165° to 205° C., the water-containing starting materials may be added in any sequence, singly or as mixtures, at such a rate that the water introduced with them in the form of water of hydration and/or solution may be removed from the mixture of azeotropic distillation, for example, by distilling off an azeotropic mixture with the halogenated aromatic compounds of formulae (I), (II) and (III) or with the solvent or additional carriers, and may then be separated. To preserve the stoichiometric proportions of the reaction, the halogenated aromatic compound may be returned to the reaction mixture after it has been separated from the water carried with it.

The reaction mixture may be worked up and the polyarylene sulphides isolated by known methods.

The polyarylene sulphide may be separated from the reaction solution by the usual methods such as filtration or centrifuging, either directly or, for example, after the addition of water and/or dilute acids. After the polyarylene sulphide has been separated, it is generally washed with water. Washing or extraction with other washing liquids which may be used together with or after the washing water may also be carried out.

The polyarylene sulphide may also be recovered, for example, by removal of the solvent by distillation followed by washing as described above.

The polyarylene sulphides according to this invention may be mixed with other polymers and with pigments and fillers, such as graphite, metal powders, glass powder, quartz powder or glass fibres; or the usual additives for polyarylene sulphides, such as stabilizers and mould release agents, may be added.

The melt flow characteristics of polyarylene sulphides are generally determined at 316° C. in accordance with ASTM 1238-70, using a 5 kg weight, and given in g/10 minutues.

When the melt flow values are high, however, this method of measurement may give rise to difficulties owing to the high outflow rate of the polymer melt.

The melt viscosity nm of the polymer melt (in Pa.s) at 306° C. was determined in dependence upon the shear stress $\tau$ (in Pa.s), using an Instron rotation viscosimeter.

This method may be used to determine the melt viscosity over a very wide range of from $10^{-1}$ to $10^7$ Pa.s. In the Instron rheometer, the polymer is melted between a solid plate and a rotable cone, and the torque of the cone is determined. The melt viscosity may then be calculated in dependence upon the shear stress from the torque, angular velocity and data of the apparatus. A rheometer Model 3250 manufactured by Instron was used (diameter of cone and plate 2 cm).

The melt viscosity is given as the value obtained at a shear stress of $\tau = 10^2$ Pa.

The polyarylene sulphides according to the invention isolated from the reaction mixture generally have melt viscosities of from $0.1 \times 10^2$ to $5 \times 10^6$ Pa.s, preferably from $0.2 \times 10^3$ to $10^4$ Pa.s. They have good colour properties and may be made up into foils, moulded articles or fibres by extrusion, extrusion blowing, injection moulding or other conventional processing techniques. These products may be employed for the usual purposes, e.g. as motor car parts, dashboards, electrical parts such as switches, electronic boards, chemically resistant and weather resistant parts and apparatus such as pump housings and pump impellers, etching baths, packing rings, parts of office machinery, valves and parts of ball bearings.

COMPARISON EXAMPLE 1

Preparation of polyphenylene sulphide according to U.S. Pat. No. 3 354 119

129 g of sodium sulphide trihydrate ($\hat{=}$1 mol $Na_2S$) and 300 g of N-methylpyrrolidone were brought together in an autoclave equipped with stirrer. The mixture was flushed with nitrogen and slowly heated to 202° C. A total of 19 ml of water distilled off (from which the residual water content is calculated to be 1.78 mol, based on the quantity of sodium sulphide in the reaction solution). The reaction mixture was then cooled to about 160° C. and 147 g of p-dichlorobenzene ($\hat{=}$1 mol) in about 50 g of methylpyrrolidone were added. The reaction mixture was heated to 245° C. under an initial nitrogen pressure of 2.5 bar for 30 minutes and this temperature was maintained for 3 hours. A final pressure of 14.5 bar was reached. After cooling to room temperature, a grey solid was isolated and then washed with water. This solid was dried under vacuum at 80° C. to yield 100.3 g (=93%) of poly-p-phenylene sulphide which was light brown in colour and characterised by a melt viscosity nm of 4.5 Pa.s. (at $\tau = 10^2$ Pa).

Thermoplastic processing is not possible without curing.

COMPARISON EXAMPLE 2

Similar to Comparison Example 1 but 1.81 g of 1,2,4-trichlorobenzene ($\hat{=}$1 mol-% based on dichlorobenzene) was used in addition to p-dichlorobenzene and the reaction was carried out at normal pressure. 48.9 g of light grey product ($\hat{=}$45.3% of the yield, based on $Na_2S$) having a melt viscosity of nm<1 Pa.s (at $\tau = 10^2$) Pa) were isolated.

EXAMPLE 1

1110 g of N-methylcaprolactam, 30.3 g of N,N-dimethylacetamide, 341.1 g of 1,4-dichlorobenzene ($\hat{=}$2.32 mol) and 4.21 g of 1,2,4-trichlorobenzene (1 mol -%, based on 1,4-dichlorobenzene) were introduced under nitrogen into a 2-liter, 3-necked flask equipped with thermometer, stirrer, coolable column, distillate divider and reflux condenser, and heated to 190°–200° C. A solution of 180.9 g of sodium sulphide hydrate ($\hat{=}$2.32 mol of S-donor) and sodium hydroxide in a total of 250 ml of water (including water of hydration) was added dropwise at such a rate that the water introduced could distil off almost simultaneously as an azeotropic mixture with 1,4-dichlorobenzene. To preserve the stoichiometric proportions, the 1,4-dichlorobenzene distilling off was returned to the reaction mixture after it had been separated from the water. When all the reactants had been added and dehydration had been completed, the column was adjusted to cooling, the reaction mixture was heated under reflux for 10 hours, and the product was then isolated in the usual manner. 237.5 g of colourless polyarylene sulphide (94.8% yield, based on 1,4-dichlorobenzene) having a melt viscosity of $n_m = 7.4 \times 10^3$ Pa.s (at $\tau = 10^2$ Pa) was obtained.

EXAMPLE 2

The same as Example 1 except that 2.73 g of 1,2,4-trichlorobenzene were used (0.65 mol-%, based on 1,4-dichlorobenzene). 225.9 g of a white polyarylene sulphide (90.2% yield based on 1,4-dichlorobenzene, melt viscosity $n_m = 1.2 \times 10^2$ Pa.s (at $\tau = 10^2$ Pa) were obtained.

EXAMPLE 3

Same as Example 1 but using 1.68 g of 1,2,4-trichlorobenzene (0.4 mol-%, based on 1,4-dichlorobenzene). 232.7 g of a white polyarylene sulphide (92.9% yield, based on 1,4-dichlorobenzene, melt viscosity $n_m = 490$ Pa.s (at $\tau = 10^2$ Pa) were isolated.

EXAMPLE 4

Same as Example 1 but without N,N-dimethylacetamide. Instead, 28.5 g of sodium acetate were added dropwise as catalyst together with the sodium sulphide. 236.1 g of a white product (94.2% yield, based on 1,4-dichlorobenzene) melt viscosity n $5.8 \times 10^3$ Pa.s (at $\tau = 10^2$ Pa) were obtained.

EXAMPLE 5

Same as Example 4 but using 1.68 g of 1,2,4-trichlorobenzene. 235.2 g of polyarylene sulphide (93.9% yield, based on 1,4-dichlorobenzene), melt viscosity $n_m = 570$ Pa.s (at $\tau = 10^2$ Pa) were isolated.

We claim:

1. In an improved process for the preparation of high molecular weight polyarylene sulphide by reacting:
   (a) 50–100 mol-% of dihalogenated aromatic compound corresponding to the formula

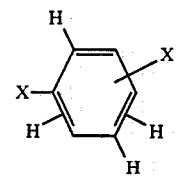

and 0–50 mol-% of dihalogenated aromatic compound corresponding to the formula

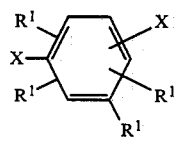

wherein
X represents halogen in the meta- or para-position to each other and
$R^1$, which may be identical or different, represents hydrogen, alkyl, cycloalkyl, aryl, alkylaryl or arylalkyl, and two of the $R^1$ groups in the ortho-position to each other may be linked together to form an aromatic or heterocyclic ring, and one $R^1$ always represents a substituent other than hydrogen, and (b) 0 to 5 mol-%, based on the sum of components (a) and (b), of a tri- or tetra-halogenated aromatic compound corresponding to the formula $ArX_n$ wherein
Ar represents an aromatic or heterocyclic group,
X represents chlorine or bromine and
n represents the integer 3 or 4, and
(c) alkali metal sulphide or alkali metal sulphide mixed with alkali metal hydroxides, the molar ratio of (a+b):c lying in the range of from 0.85:1 to 1.15:1, and
(d) an organic solvent wherein the molar ratio of alkali metal sulphide (c) to the organic solvent (d) lies within the range of from 1:2 to 1:15, the improvement comprises heating a mixture of reactants which are anhydrous to 150° to 205° C., whereupon the reactants containing water are then added at such a rate that the water introduced with the water-containing reactants is distilled off continuously to thereby obtain and maintain an anhydrous reaction mixture and subsequently conducting the reaction in the absence of water at temperatures of from 210° to 270° C.

2. A process according to claim 1 wherein the alkali metal sulphide reactant (c) contains water.

3. A process according to claim 1 wherein N-methyl-ω-caprolactam is said organic solvent.

4. A process according to claim 1 wherein at least one alkali metal carboxylate is used as catalyst.

5. A process according to claim 1 wherein an N,N-dialkyl-carboxylic acid amide is used as a cosolvent.

6. A process according to claim 1 wherein 1,4-dichlorobenzene is the dihalogenated aromatic compound of (a).

7. A process according to claim 1 for the preparation of branched polyarylene sulphides wherein 1,2,4-trichlorobenzene is the polyhalogenated aromatic compound of (b).

* * * * *